April 28, 1931. V. A. BOKER 1,802,700

NOZZLE FOR LUBRICATING SYSTEMS

Filed Sept. 9, 1929

Inventor
Vitus A. Boker
By his Attorneys

Patented Apr. 28, 1931

1,802,700

UNITED STATES PATENT OFFICE

VITUS A. BOKER, OF MINNEAPOLIS, MINNESOTA, ASSIGNOR TO MIN-A-MAX CO., OF MINNEAPOLIS, MINNESOTA, A CORPORATION OF MINNESOTA

NOZZLE FOR LUBRICATING SYSTEMS

Application filed September 9, 1929. Serial No. 391,228.

My present invention relates to lubricating devices such as used for forcing grease under a high pressure to the journals, bearing and other parts of automobiles, and provides certain highly improved features hereinafter described and defined in the claim.

Devices or apparatus of the character above indicated comprise nipples on the parts to receive the lubricant and high pressure grease guns having discharge nozzles detachable and engageable with the nipples at will in the grease or lubricant delivery action. For efficient lubrication it has been found that the grease guns should be of a character to produce pressures from five to ten thousand pounds per square inch. Certain types of such lubricating apparatus provide for an interlocking engagement between the nipples and nozzles and in such apparatus the interlocking engagement will hold the nozzle to the nipple under high pressures. Interlocking nozzles and nipples require considerable careful manipulation to affect the interlocking engagement and in many places, this is very difficult to accomplish, and in all cases requires more time than would a simple pressure engagement. Hence, there has been provided other types in which engagement of the nozzle with the nipple is accomplished simply by straight-line pressure, but in such devices it has been found difficult even under pressures considerably less than five thousand pounds per square inch, to maintain grease-tight contact between the nozzle and nipple simply by hand pressure which is the only practical way of maintaining such contact, and under higher pressures say, for example, eight thousand pounds per square inch, it has been practically impossible to maintain such grease-tight contact, and the reason for this has been as follows:

It is, of course, a fact that the pressure tending to separate the nozzle from the nipple under the grease-delivery pressure and which pressure must be overcome by the hand pressure, is found by multiplying the area in square inches of the contact circle or line of engagement between the nozzle and nipple by the pressure per square inch on the grease or lubricating material. Hitherto the smallest area of contact line between the nozzle and nipple which has been employed has been that of a circle of approximately one-quarter inch in diameter, and the area of which is approximately the decimal .0491 and this multiplied by eight thousand, the assumed pounds per square inch in the oil pressure, gives a pressure of 392.8 pounds in force tending to separate the nozzle from the nipple and which pressure will have to be overcome to hold the nipple seated in the nozzle. It is thought to be obvious, and in fact has been found to be impossible or impracticable by hand pressure which should simply be pressure from one hand delivered on the nozzle, to overcome any such back pressure on the nozzle.

I have found, however, that this serious defect in the hitherto used nozzle and nipple structures may be overcome by reducing the area of circle or line of contact between the nipple and nozzle to one-sixteenth of an inch or to substantially that dimension or less. The result accomplished by this reduction is made obvious by the following figures. The area of a circle of one-sixteenth of an inch diameter is represented by the decimal .00308 and this again multiplied by the eight thousand, the assumed grease pressure, gives 24.64 pounds in force tending to unseat the nozzle from the nipple. Obviously, this small pressure of less than twenty-five pounds, can be very easily and practically overcome in seating a nozzle with one hand and by this expedient I made it possible, in practice, to use simply pressure-seated nozzle and nipple structures capable of quick and easy manipulation by one hand of an operator in connection with very high pressure grease guns.

In the use of small pointed nozzles for coupling nipples having capillary or very small grease-receiving passages, it is difficult to quickly effect the proper engagement between the two and hence, as an important feature I provide the nozzle with a surrounding aligning sleeve that is engageable with the nipple to direct the point of the nozzle into the grease-receiving passage of the nipple but which does not have contact with the nipple when the nozzle is properly seated.

The invention is illustrated in the accompanying drawings, wherein like characters indicate like parts throughout the several views.

Referring to the drawings.

Figure 2:
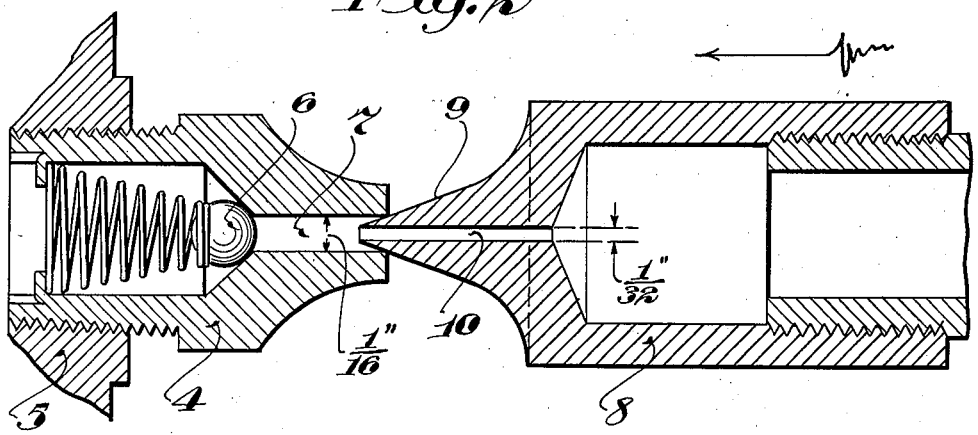
Fig. 2 is a section on the line 2—2 of Fig. 1.
Figure 1:
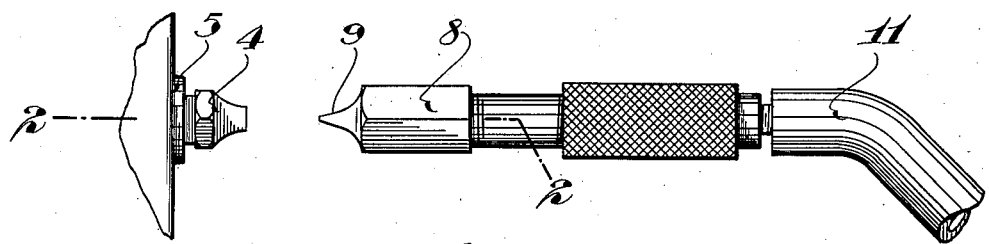
Fig. 1 is a plan view with some parts broken away illustrating a nipple and nozzle structure of the character above indicated.
Figure 3:
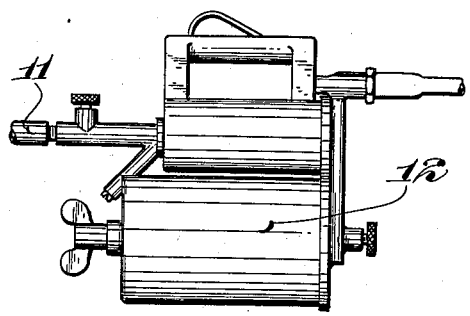
Fig. 3 is a plan view illustrating a high pressure grease gun that may be used as a part of the lubricating device or apparatus.

Attention is called to the fact that Fig. 1 shows a nozzle and nipple in substantially actual scale whereas Fig. 2 shows the nozzle and nipple on a very greatly enlarged scale. The nipple 4, as shown, is screwed into the member 5 that is to receive the grease or lubricant from the nipple. The nipple, as shown, is provided with the customary inwardly-opening check valve 6. The nipple 4 is provided with the above indicated very small grease-receiving conduit or passage 7 that has a diameter of one-sixteenth of an inch or even less. The nozzle 8 is provided with a straight-line tapered delivery end 9 having an axial passage 10 with approximately one-thirty-second of an inch in diameter. The point of the end 9 tapers to a diameter considerably less than one-sixteenth of an inch preferably to approximately one-thirty-second of an inch in diameter so that it will readily enter the passage 7 of the nozzle.

The nozzle 8 by a flexible grease-delivery pipe 11 is connected to a grease gun of suitable construction indicated as an entirety by the numeral 12. This grease gun is of a type that will produce pressure of from five to ten thousand pounds per square inch and it may be assumed to be a grease gun of a type disclosed and claimed in my co-pending application.

Inasmuch as the nozzle passage 7 is cylindrical at its outer end portion, and hence, is a true circle, and since the tapered end 9 of the nozzle is truly conical, it, of course, follows that the nozzle and nipple must be in substantially axial alignment to produce perfect and complete contact between the nozzle and nipple in the grease-delivery end.

In actual practice, the advantages above set forth in respect to the device constructed in accordance with my invention, has been thoroughly demonstrated and it has been found that it is a very easy matter to maintain grease-tight contact between the nipple and nozzle under the very high pressures above indicated, simply by holding the nozzle in one hand and pressing the same with comparative ease against the nipple. In setting forth the features above discussed, it should be borne in mind that it is not primarily the size of the grease-delivery conduits, but the diameter of the circular line of contact between the nozzle and the nipple which, multiplied by the grease pressure, determines the force tending to separate the nozzle from the nipple.

What I claim is:

The combination of a grease-receiving nipple having a nozzle-receiving aperture therein not materially more than one-sixteenth of an inch in diameter, of a grease delivery nozzle, having a substantially uniformly tapered conical tip and also having a nozzle aperture axially through said tip, the latter being so tapered as to approach adjacent its end the diameter of said nozzle aperture, and to be operatively wedged within the nozzle-receiving aperture, whereby the tip may be held within the nozzle-receiving aperture by manual pressure under grease injecting pressures of approximately 8000 lbs. per square inch without leakage around the nozzle-receiving aperture.

In testimony whereof I affix my signature.

VITUS A. BOKER.